(12) United States Patent
Yoshida

(10) Patent No.: US 10,205,842 B2
(45) Date of Patent: Feb. 12, 2019

(54) INFORMATION PROCESSING SYSTEM IN WHICH AN INFORMATION PROCESSING APPARATUS SENDS UPDATED SETTING INFORMATION TO A CONNECTED DEVICE, INFORMATION PROCESSING APPARATUS, CONTROL METHOD OF INFORMATION PROCESSING APPARATUS, AND STORAGE MEDIUM

(71) Applicant: CANON KABUSHIKI KAISHA, Tokyo (JP)

(72) Inventor: Toru Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/503,558

(22) PCT Filed: Sep. 10, 2015

(86) PCT No.: PCT/JP2015/004603
§ 371 (c)(1),
(2) Date: Feb. 13, 2017

(87) PCT Pub. No.: WO2016/059749
PCT Pub. Date: Apr. 21, 2016

(65) Prior Publication Data
US 2017/0244857 A1      Aug. 24, 2017

(30) Foreign Application Priority Data
Oct. 14, 2014   (JP) .................................. 2014-210169

(51) Int. Cl.
*H04N 1/00* (2006.01)
*H04N 1/21* (2006.01)

(52) U.S. Cl.
CPC ....... *H04N 1/00931* (2013.01); *H04N 1/0097* (2013.01); *H04N 1/00244* (2013.01);
(Continued)

(58) Field of Classification Search
None
See application file for complete search history.

(56) References Cited

U.S. PATENT DOCUMENTS 7,042,596 B1    5/2006  Yoshida
7,428,657 B2    9/2008  Yamasaki
(Continued)

FOREIGN PATENT DOCUMENTS

JP    2007-115007 A    5/2007
JP    2013-250759 A    12/2013

OTHER PUBLICATIONS

Jim, et al, "How to Build a File Synchronizer," Feb. 22, 2002, http://www.cis.upenn.edu/~bcpierce/courses/dd/papers/unisonimpl.ps, pp. 1-13.
(Continued)

*Primary Examiner* — Thomas D Lee
(74) *Attorney, Agent, or Firm* — Venable LLP

(57) ABSTRACT

In a case where data synchronization between a server and a client is performed by difference synchronization, when the data of the server is restored by backup data, a mismatch occurs between the data held in the client and the data held in the server. If the previous synchronization with the client has been performed before restoring, the client is synchronized with all the data held in the server. If the previous synchronization with the client is after restoring, the server notifies the client of data update contents in the server since the previous update with the client and causes the client to update the held data.

6 Claims, 15 Drawing Sheets

(52) U.S. Cl.
CPC ........... *H04N 1/00973* (2013.01); *H04N 1/21* (2013.01); *H04N 2201/0094* (2013.01)

(56) References Cited

U.S. PATENT DOCUMENTS

| | | |
|---|---|---|
| 7,565,572 B2 | 7/2009 | Yamasaki |
| 2005/0044446 A1* | 2/2005 | Sakurai ............... G06F 11/1464 714/13 |
| 2007/0094467 A1 | 4/2007 | Yamasaki |
| 2009/0044046 A1 | 2/2009 | Yamasaki |
| 2017/0004392 A1 | 1/2017 | Yoshida |

OTHER PUBLICATIONS

Ramsey, et al., "An Algebraic Approach to File Synchronization," Software Engineering Notes, ACM, vol. 26, No. 5, Sep. 1, 2001, New York, NY, pp. 175-185.

Balasubramaniam, et al. "What is a File Synchronizer?," MOBICOM '98 Proceedings of the 4th Annual ACM/IEEE International Conference on Mobile Computing and Networking, Dallas TX, Oct. 25-30, 1998, pp. 98-108.

Feb. 8, 2016 International Search Report and Written Opinion in international application PCT/JP2015/004603.

\* cited by examiner

[Fig. 1]
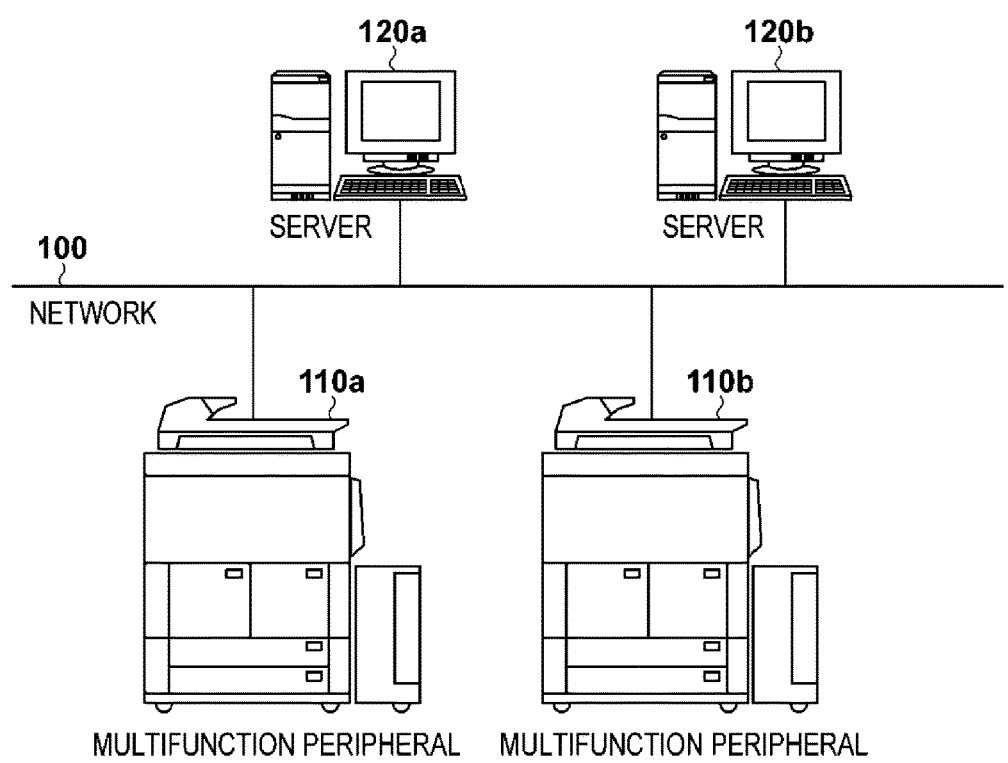

[Fig. 2]
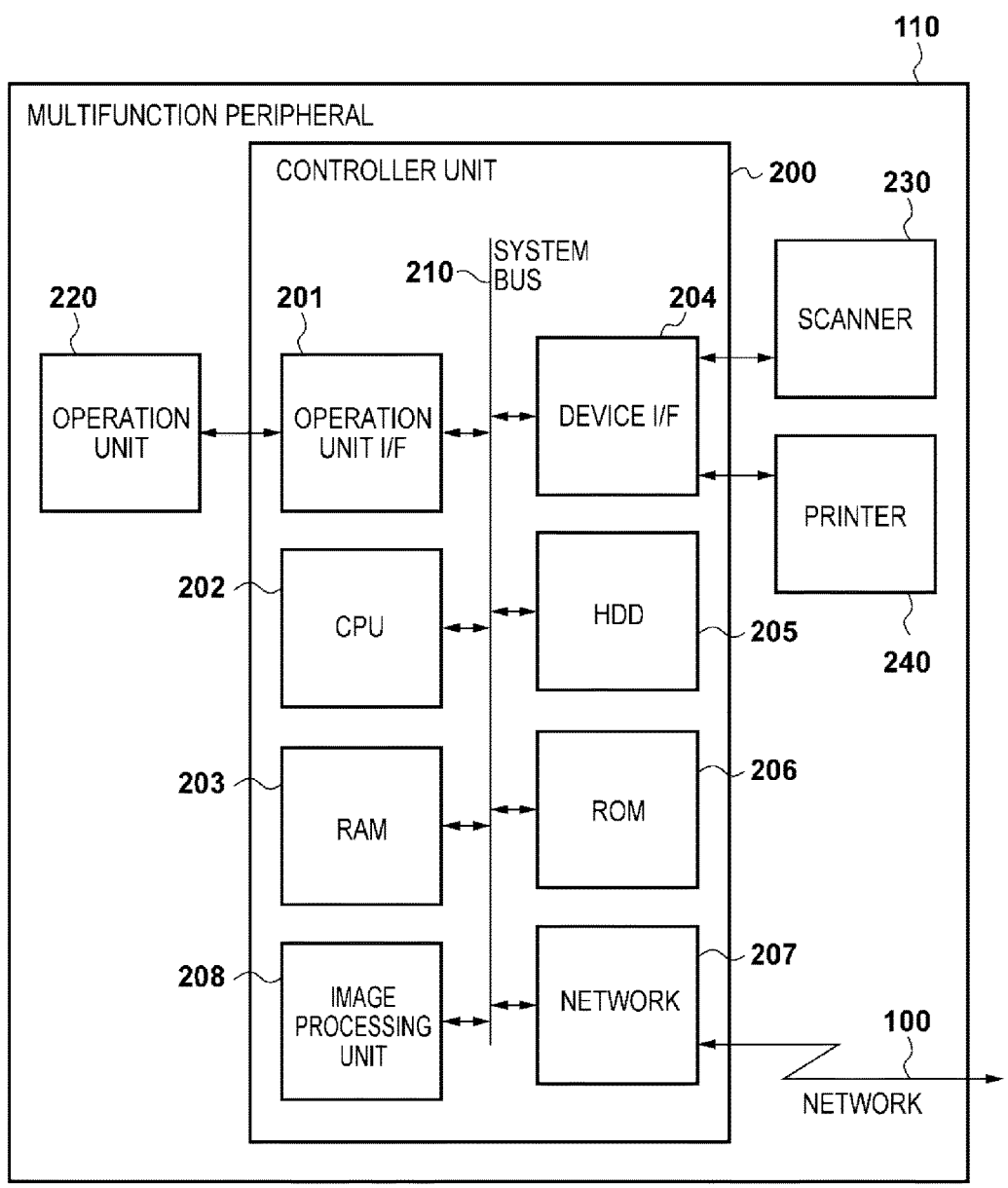

[Fig. 3]
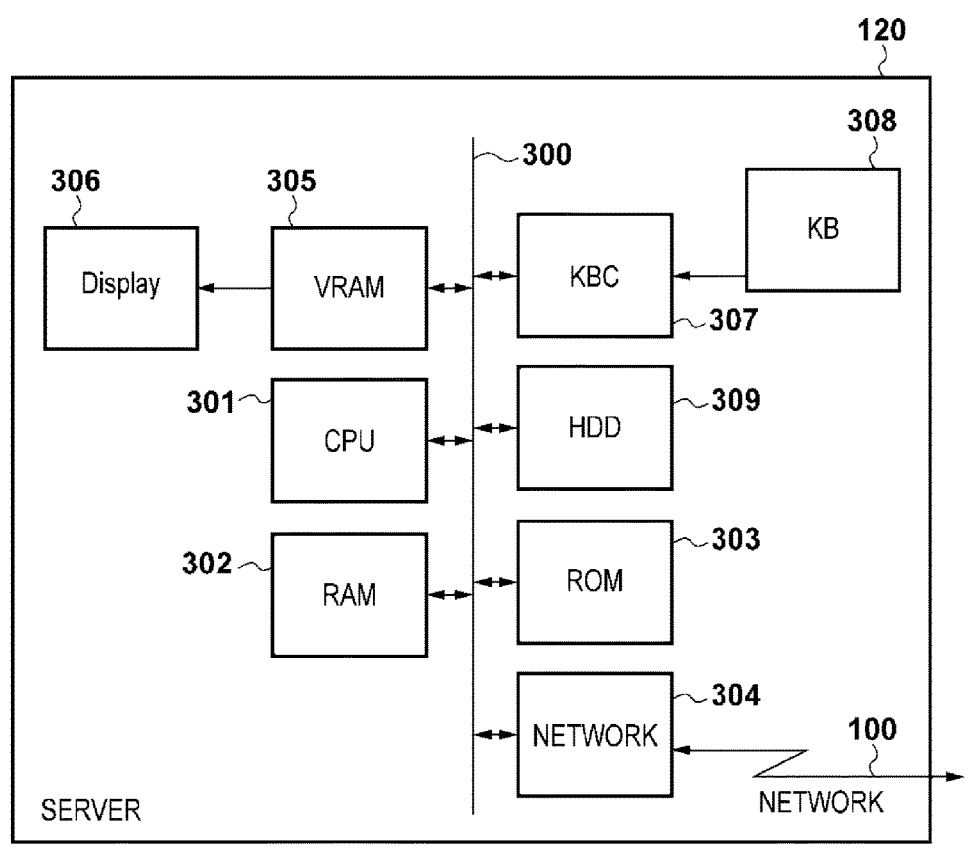

[Fig. 4]
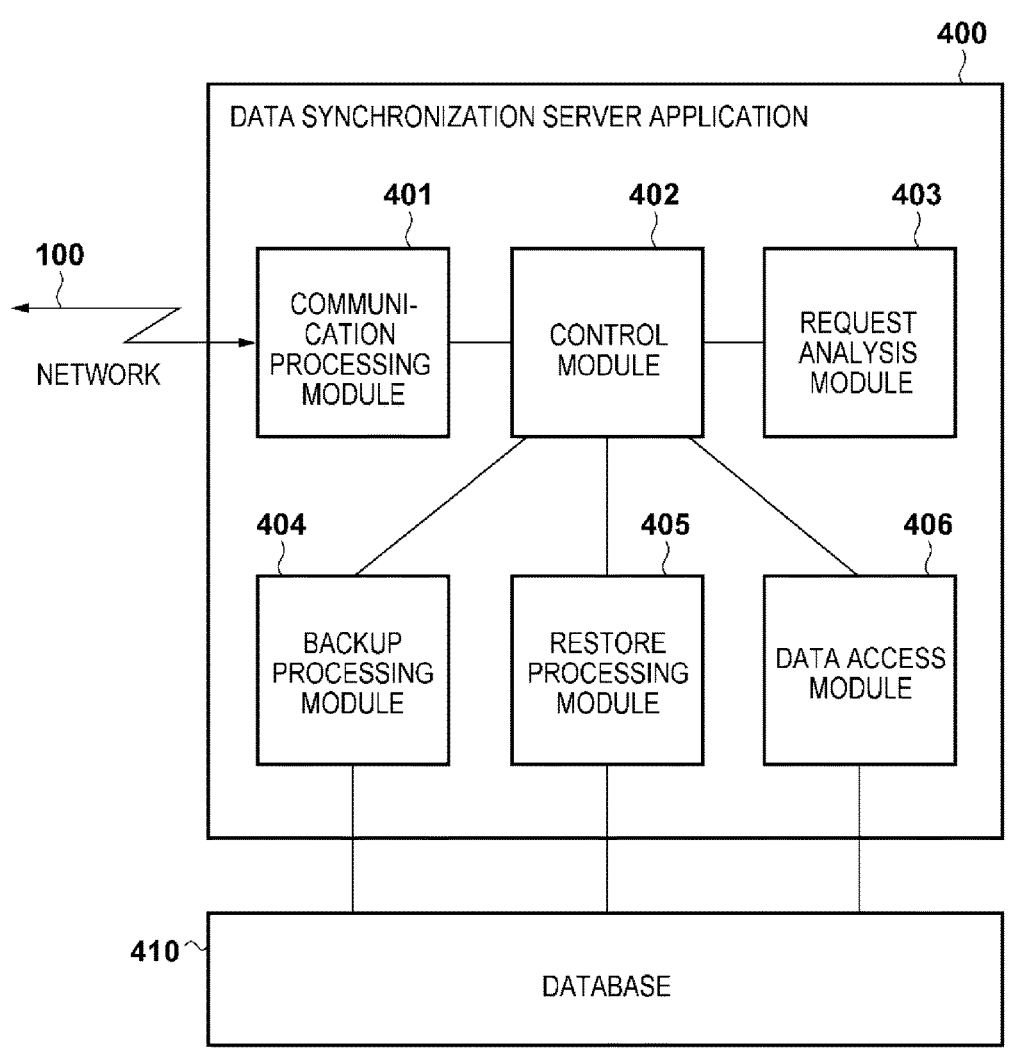

[Fig. 5]
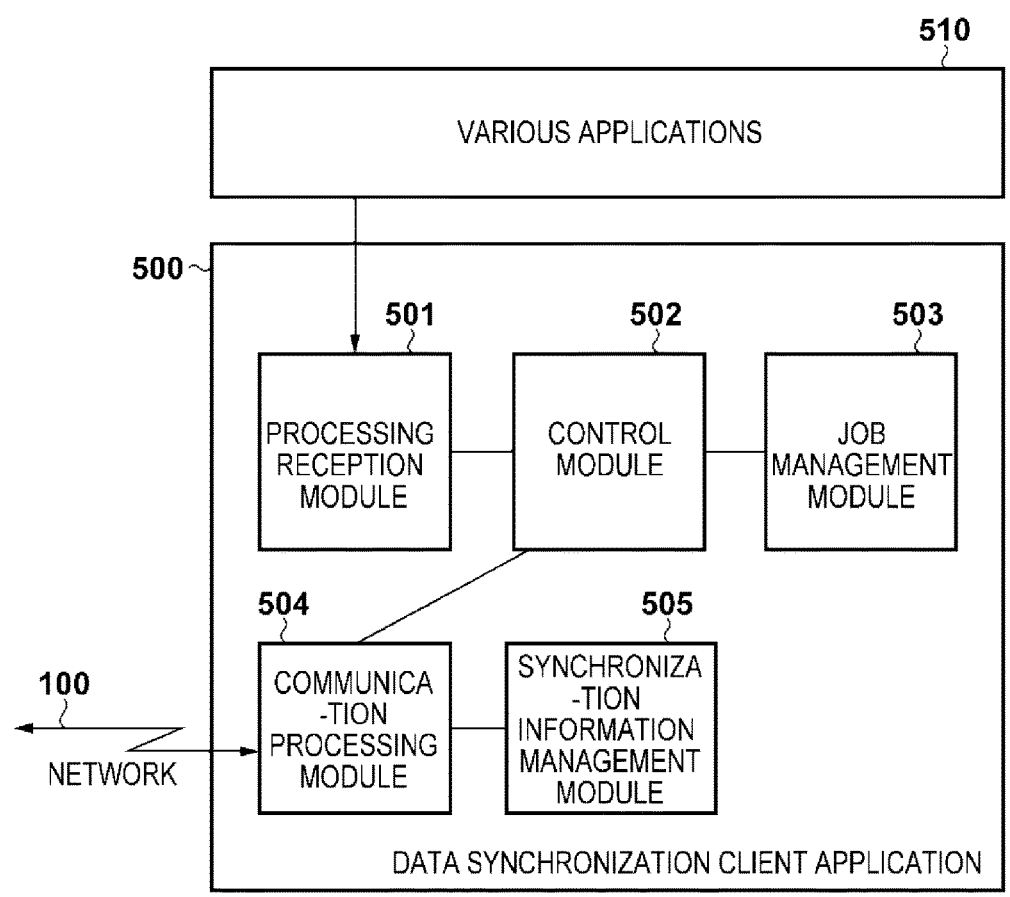

[Fig. 6]
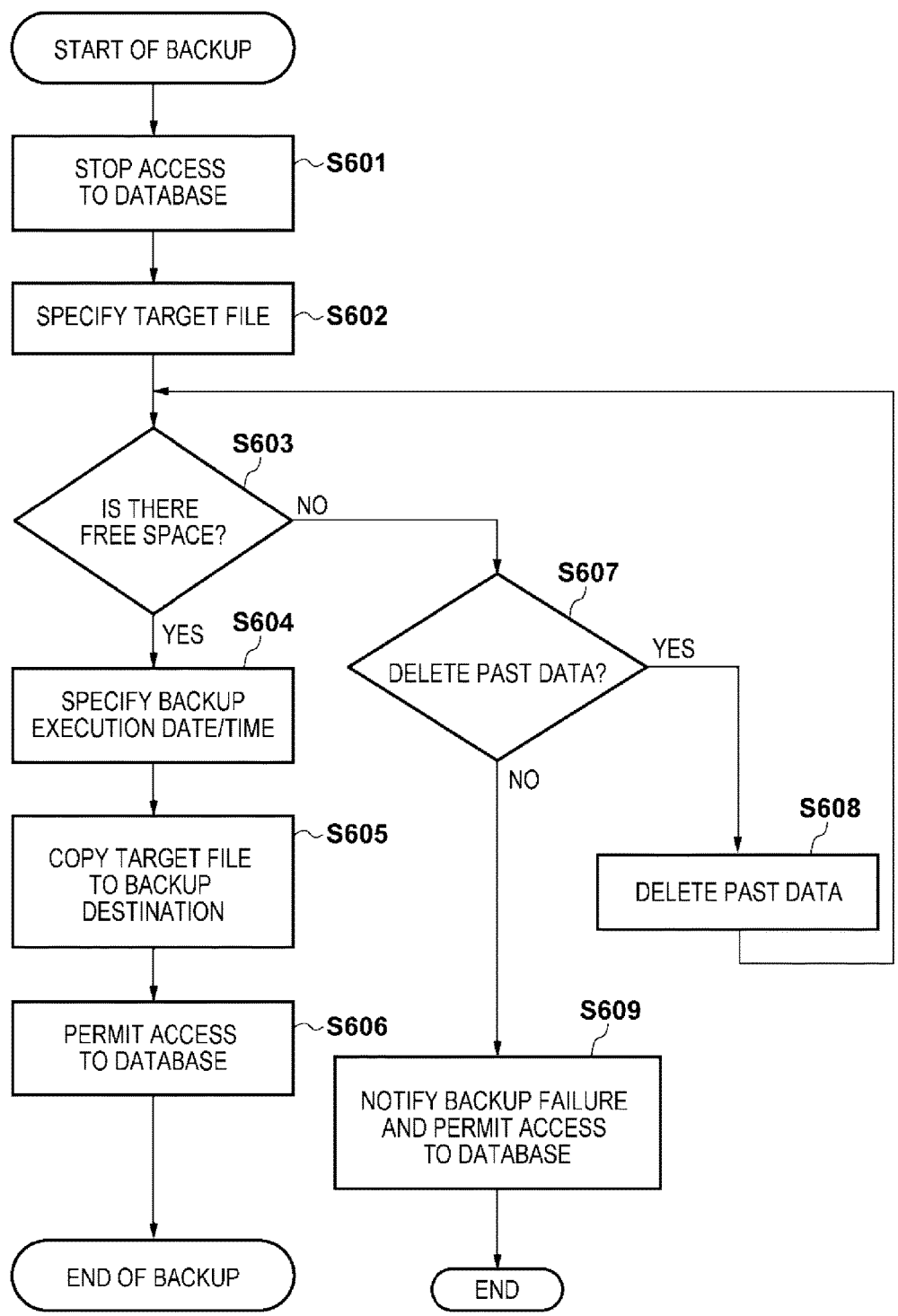

[Fig. 7]
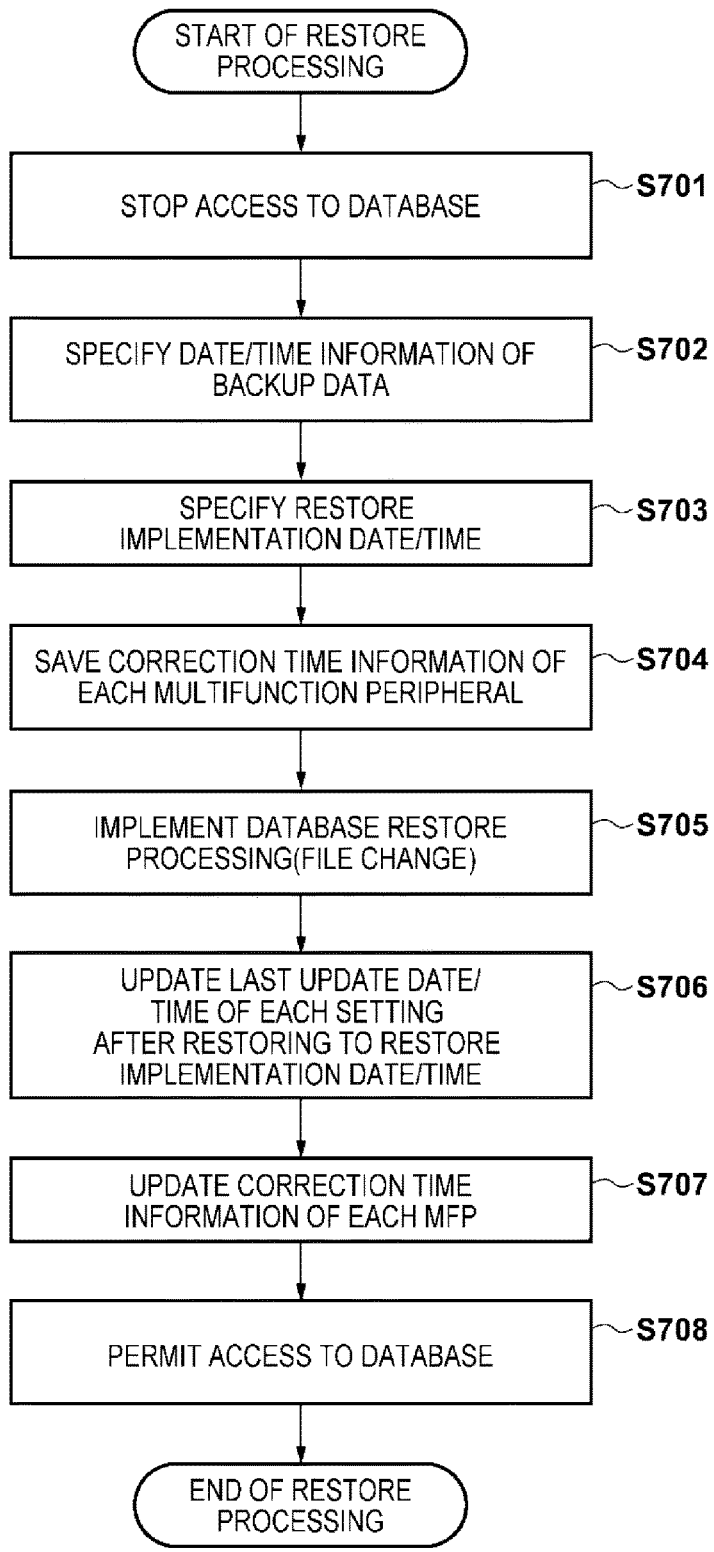

[Fig. 8]

| 811 | 812 | 813 | 814 | 815 810 |
|---|---|---|---|---|
| ID | IDENTIFICATION ID | APPARATUS NAME | LAST ACCESS DATE/TIME | CORRECTION TIME |
| D00001 | ABC123 | MULTIFUNCTION PERIPHERAL 110a | 2014/08/27 12:51:24.741 | +00:00:00.000 |
| D00002 | DEF456 | MULTIFUNCTION PERIPHERAL 110b | 2014/08/27 10:54:14.369 | -00:00:34.254 |

| 821 | 822 | 823 | 824 | 825 820 |
|---|---|---|---|---|
| Key | Value | APPARATUS ID | LAST UPDATE DATE/TIME | DATA UPDATE DATE/TIME |
| color_setting | color | D00001 | 2014/08/04 15:35:14.254 | 2014/08/04 15:35:14.121 |
| display_language | japanease | D00001 | 2014/07/21 10:46:08.564 | 2014/07/21 10:46:07.445 |

| 831 | 832 | 833 | 834 | 835 830 |
|---|---|---|---|---|
| USER ID | PASSWORD | NAME | LAST UPDATE DATE/TIME | DATA UPDATE DATE/TIME |
| U1001 | pass1 | User1 | 2014/04/01 10:00:21.554 | 2014/04/01 10:00:22.002 |
| U1002 | pass2 | User2 | 2014/04/01 10:00:54.323 | 2014/04/01 10:00:54.885 |

| 841 | 842 | 843 | 844 | 845 840 |
|---|---|---|---|---|
| Key | Value | USER ID | LAST UPDATE DATE/TIME | DATA UPDATE DATE/TIME |
| fax_address_1 | 012-345-6789 | U1001 | 2014/08/05 18:34:11.478 | 2014/08/06 02:22:55.685 |
| display_language | english | U1001 | 2014/04/02 09:41:07.225 | 2014/04/02 09:41:07.445 |

[Fig. 9]

| 811 | 812 | 813 | 814 | 815 810 |
|---|---|---|---|---|
| ID | IDENTIFICATION ID | APPARATUS NAME | LAST ACCESS DATE/TIME | CORRECTION TIME |
| D00001 | ABC123 | MULTIFUNCTION PERIPHERAL 110a | 2014/08/27 12:51:24.741 | +00:00:00.000 |
| D00002 | DEF456 | MULTIFUNCTION PERIPHERAL 110b | 2014/08/27 10:54:14.369 | −00:00:34.254 |

| 821 | 822 | 823 | 824 | 825 820 |
|---|---|---|---|---|
| Key | Value | APPARATUS ID | LAST UPDATE DATE/TIME | DATA UPDATE DATE/TIME |
| color_setting | color | D00001 | 2014/08/28 08:00:00.225 | 2014/08/28 08:00:00.365 |
| display_language | japanease | D00001 | 2014/08/28 08:00:00.225 | 2014/08/28 08:00:00.365 |

| 831 | 832 | 833 | 834 | 835 830 |
|---|---|---|---|---|
| USER ID | PASSWORD | NAME | LAST UPDATE DATE/TIME | DATA UPDATE DATE/TIME |
| U1001 | pass1 | User1 | 2014/08/28 08:00:00.225 | 2014/08/28 08:00:00.389 |
| U1002 | pass2 | User2 | 2014/08/28 08:00:00.225 | 2014/08/28 08:00:00.390 |

| 841 | 842 | 843 | 844 | 845 840 |
|---|---|---|---|---|
| Key | Value | USER ID | LAST UPDATE DATE/TIME | DATA UPDATE DATE/TIME |
| fax_address_1 | 012-345-6789 | U1001 | 2014/08/28 08:00:00.225 | 2014/08/28 08:00:01.145 |
| display_language | english | U1001 | 2014/08/28 08:00:00.225 | 2014/08/28 08:00:01.146 |

[Fig. 10]
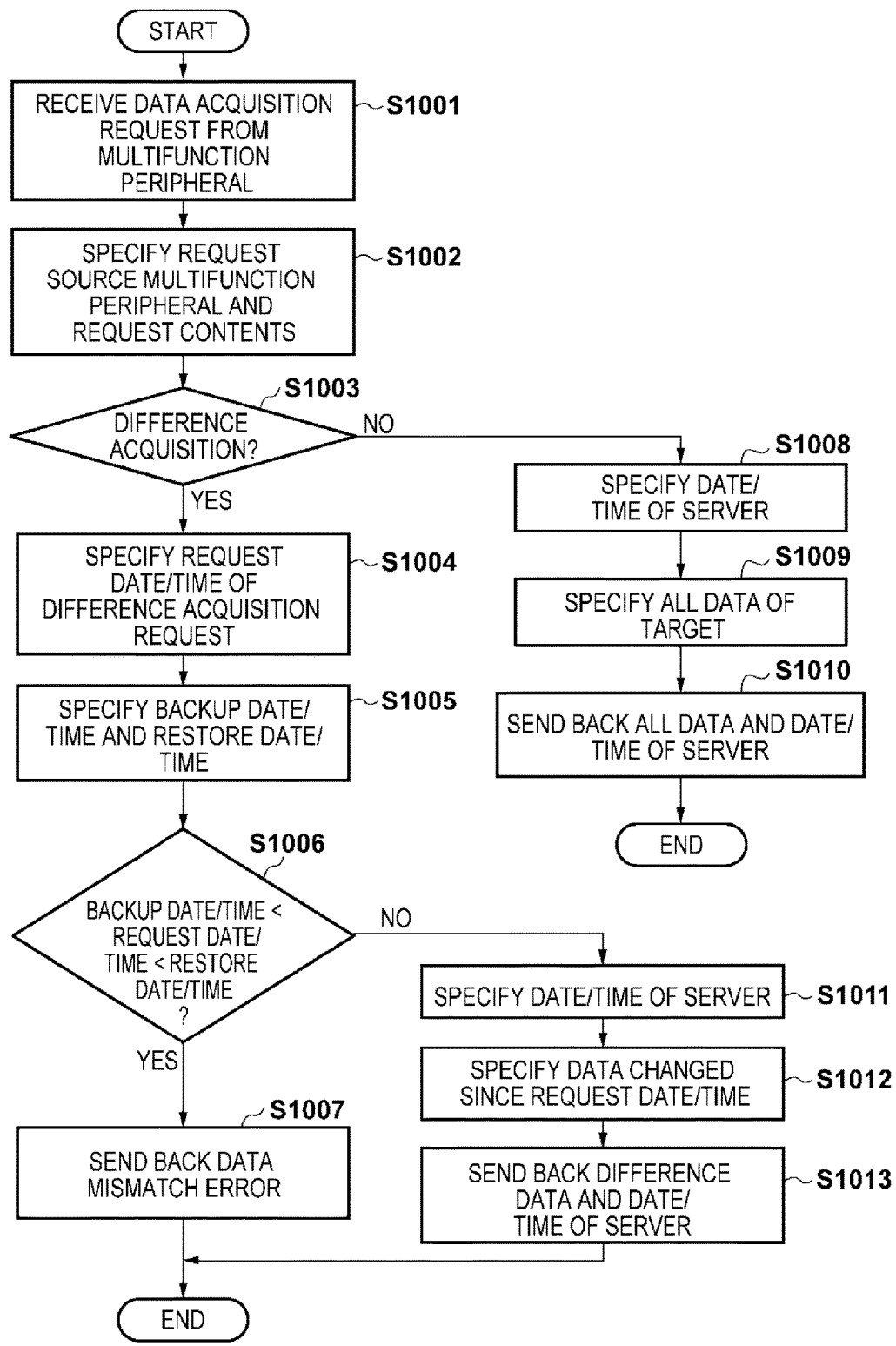

[Fig. 11]
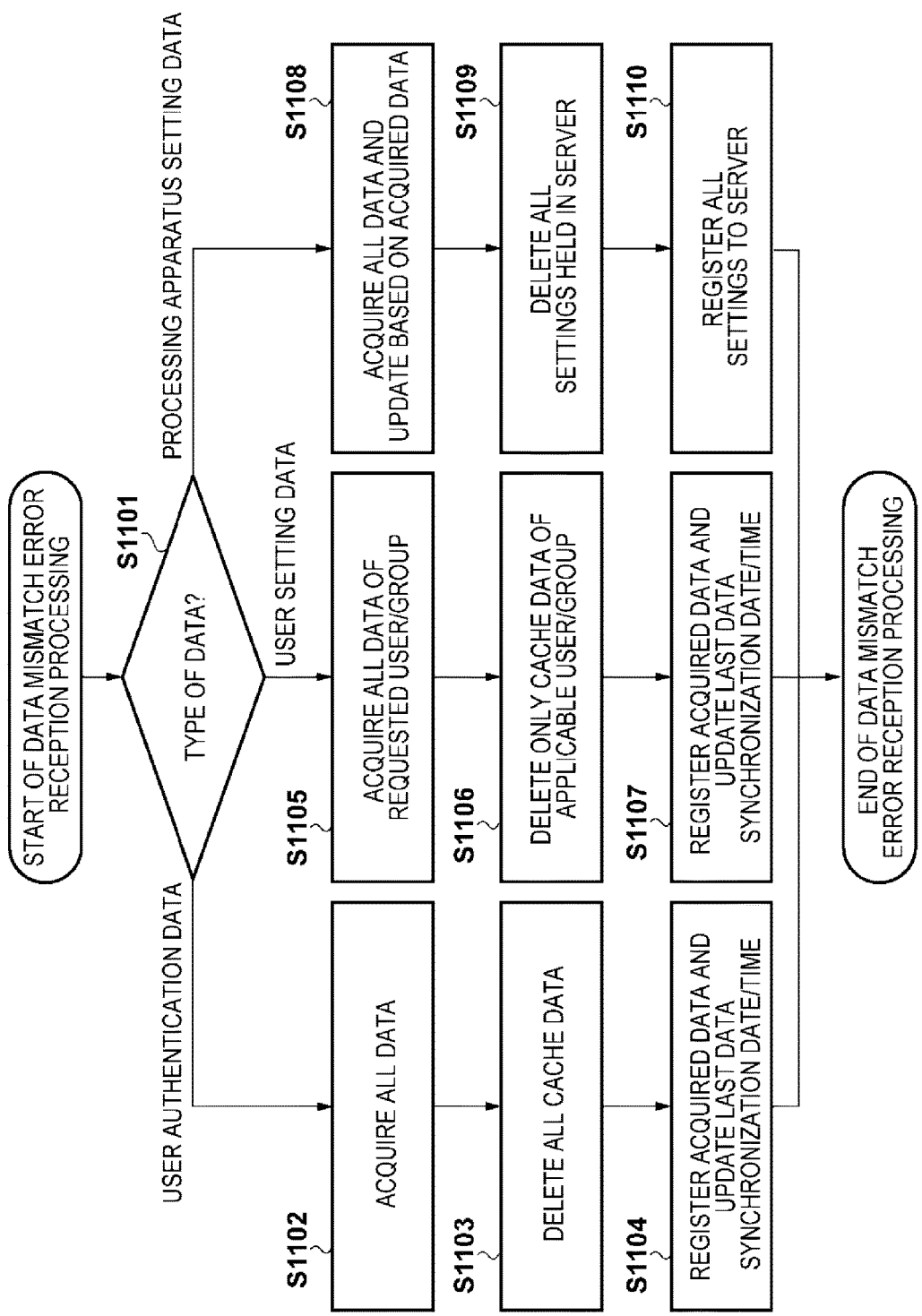

[Fig. 12]
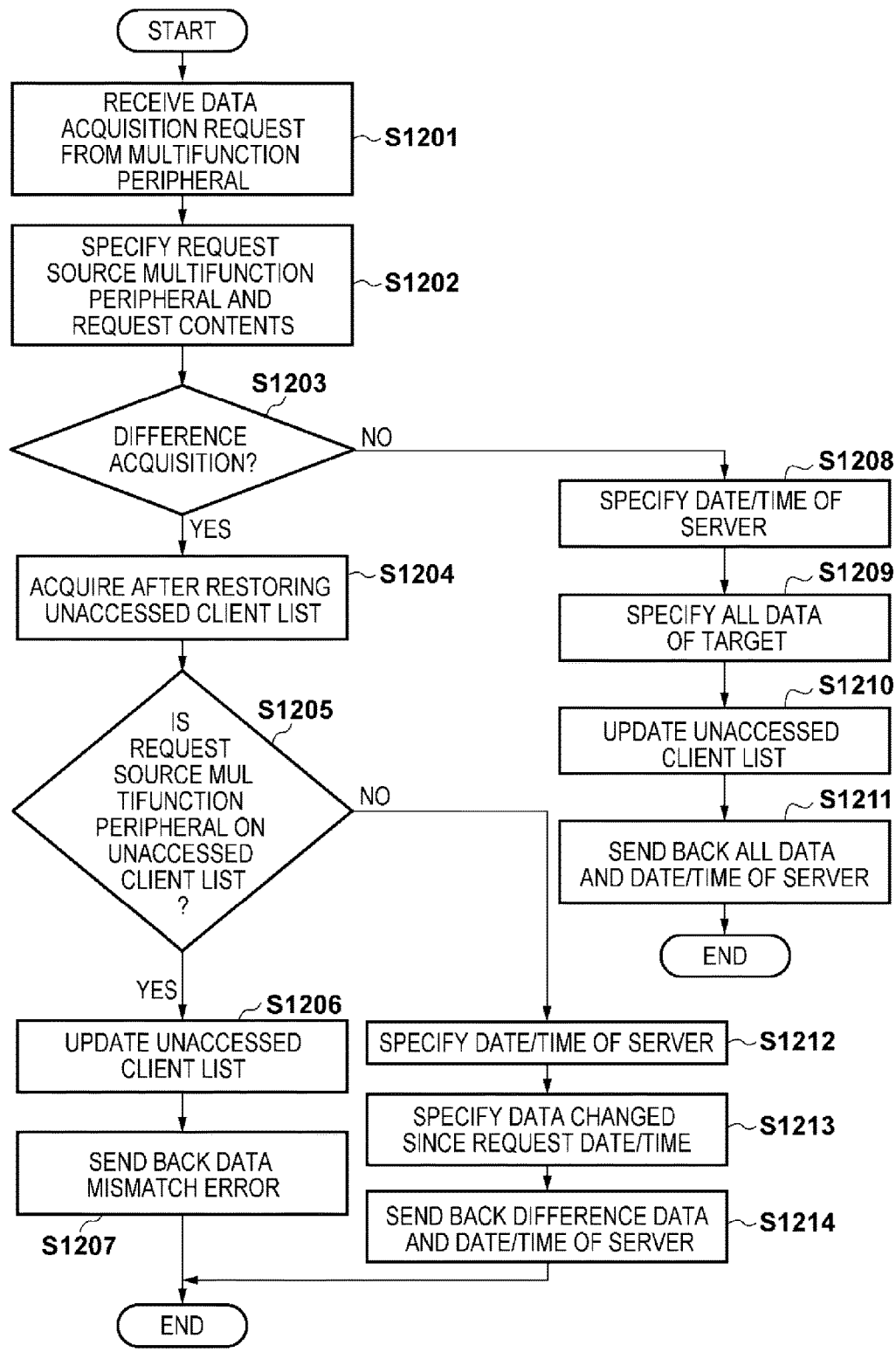

[Fig. 13]

UNACCESSED CLIENT LIST

| APPARATUS ID | TARGET DATA |
|---|---|
| D00001 | APPARATUS SETTING DATA |
| D00001 | USER AUTHENTICATION DATA |
| D00001 | USER SETTING DATA |
| D00002 | APPARATUS SETTING DATA |
| D00002 | USER AUTHENTICATION DATA |
| D00002 | USER SETTING DATA |
|  |  |

[Fig. 14]
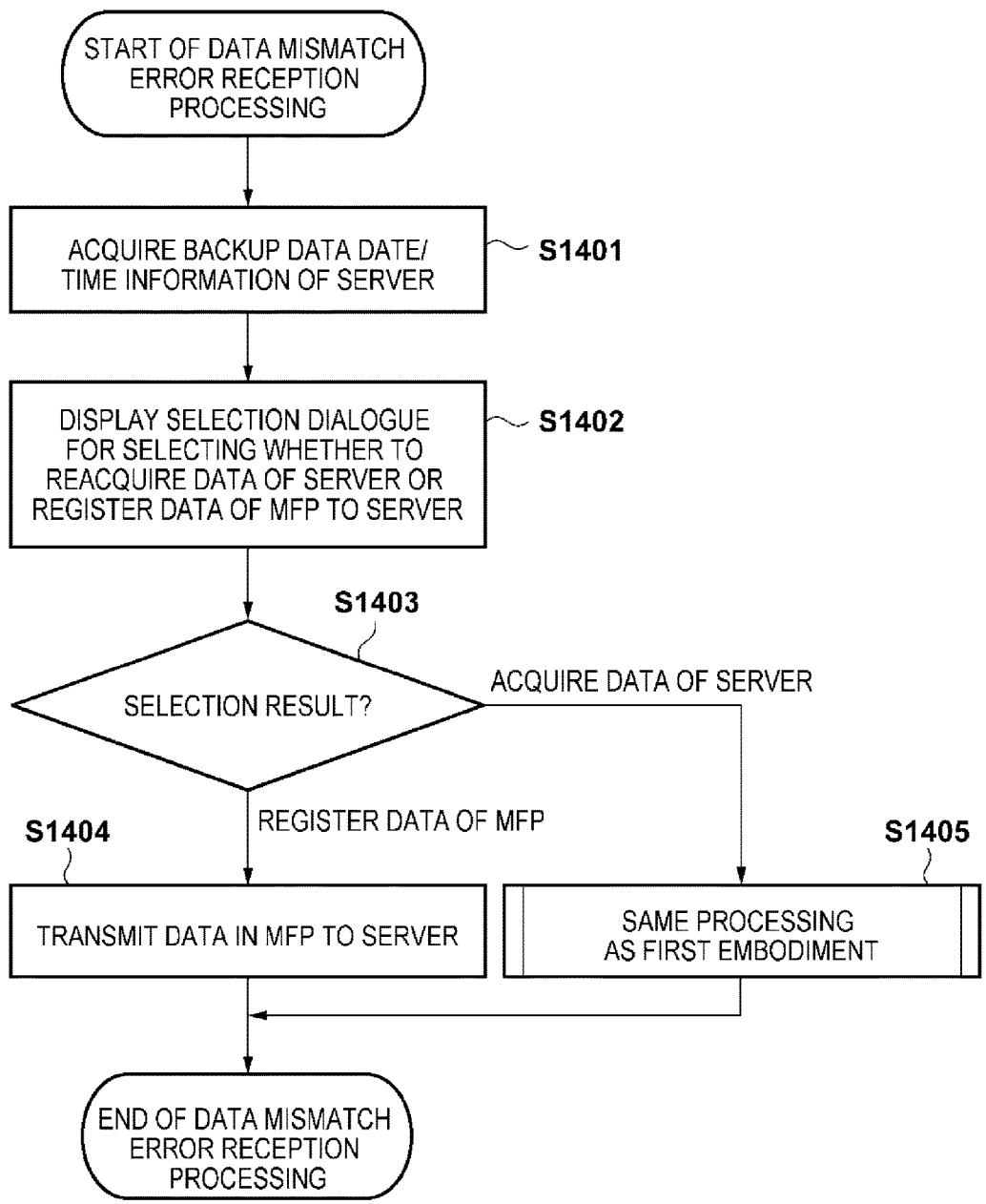

[Fig. 15]
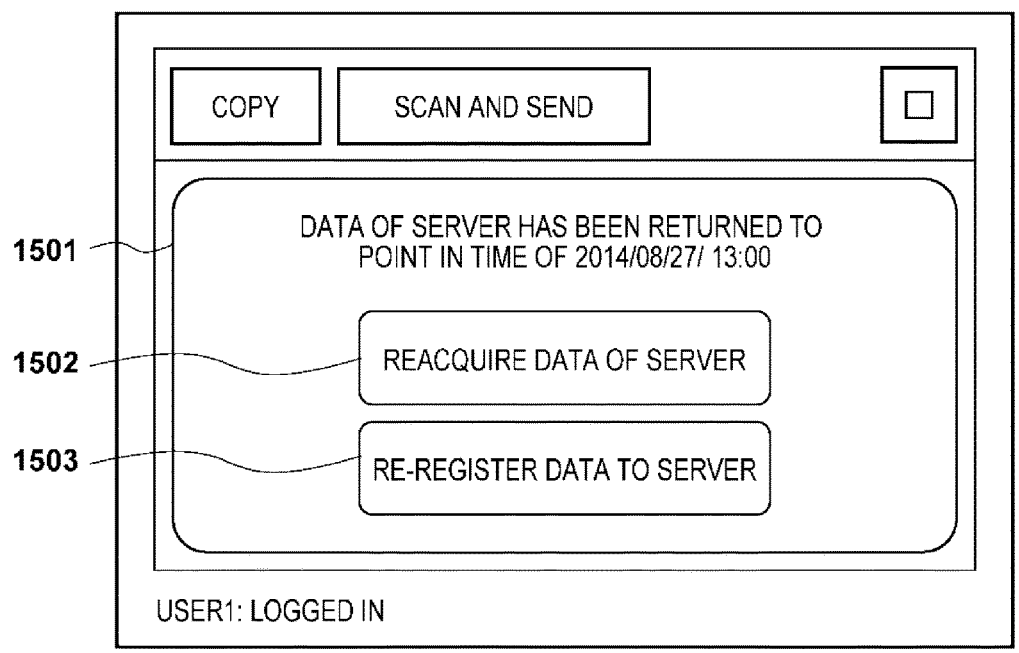

INFORMATION PROCESSING SYSTEM IN WHICH AN INFORMATION PROCESSING APPARATUS SENDS UPDATED SETTING INFORMATION TO A CONNECTED DEVICE, INFORMATION PROCESSING APPARATUS, CONTROL METHOD OF INFORMATION PROCESSING APPARATUS, AND STORAGE MEDIUM

TECHNICAL FIELD

Embodiments described herein relate to an information processing apparatus for performing data difference synchronization between information apparatuses, a data synchronization method, and a data synchronization system.

BACKGROUND ART

Conventionally, as a method of synchronizing data between information processing apparatuses, there is a method of difference synchronization that performs synchronization by using only the difference information in order to reduce the data transfer amount on a network. Japanese Patent Laid-Open No. 2007-115007 proposes a technique of updating data of one information apparatus by using data of another information processing apparatus, if the data of the one apparatus is deleted due to restore processing when past data is restored and recovered while performing difference synchronization. It also proposes, for a case where synchronization is performed between a server and a client, a synchronization system that only temporarily uses data of the client to keep data of the server constantly as the master. In Japanese Patent Laid-Open No. 2013-250759, there is proposed a system that performs synchronization while holding temporary data differences of a client even when it is disconnected from the network.

SUMMARY

As conventional methods assume that recovery is performed by using data on the side of a slave (client) even in a case where backup data is restored on the side of a master (server), synchronization processing that causes the restored master to synchronize an entire system cannot be implemented.

The first embodiment according to the present invention has the following arrangement. That is, there is provided an information system including an information processing apparatus and a device, the information processing apparatus comprising:

first holding means for holding setting data used by the device;

control means for controlling backup of the setting data held by the holding means and execution of restoring the setting data backed up to the holding means; and notification means for notifying, when sharing setting data with the device after the execution of restoring, the device in which previous sharing of setting data with the information processing apparatus is performed after the restoring, of update information indicating a difference between first setting data previously shared with the device and second setting data held by the holding means, and the device comprising:

second holding means for holding setting data; and requesting means for requesting, when the previous sharing of the setting data with the information processing apparatus is performed before the execution of restoring, the information processing apparatus to transmit one entire setting data as a sharing target with the device out of the setting data held by the first holding means after the execution of restoring.

Further features of the present invention will become apparent from the following description of exemplary embodiments with reference to the attached drawings.

BRIEF DESCRIPTION OF DRAWINGS

FIG. 1 is a view showing the arrangement of a system;

FIG. 2 is a block diagram showing the arrangement in a multifunction peripheral;

FIG. 3 is a block diagram showing the arrangement in a server;

FIG. 4 is a block diagram showing the configuration of a data synchronization server processing program;

FIG. 5 is a block diagram showing the configuration of a data synchronization client processing program;

FIG. 6 is a flowchart of backup processing;

FIG. 7 is a flowchart of restore processing;

FIG. 8 shows tables showing data examples managed in a database;

FIG. 9 shows tables showing data examples managed in a restored database;

FIG. 10 is a flowchart of server-side data synchronization processing;

FIG. 11 is a flowchart of client-side data synchronization processing;

FIG. 12 is a flowchart of server-side data synchronization processing according to the third embodiment;

FIG. 13 is a table showing an example of list information data;

FIG. 14 is a flowchart of client-side data synchronization processing according to the fourth embodiment; and FIG. 15 is a view showing an example of a screen.

DESCRIPTION OF EMBODIMENTS

First Embodiment

<System Arrangement>

An information sharing system (information processing system) according to the embodiment shares setting information and configuration information between a server (information processing apparatus) and a client (device). Setting information is information used by a client for its operation. Configuration information is information that indicates the function of the client. The information sharing system according to the embodiment causes information held in the server and information held in the client to be shared between the apparatuses, for every predetermined timing. In this manner, even if information held in either the server or the client changes along with the elapse of time, the changed information is shared with the other apparatus. In the following description, processing for sharing information between a server and a client will be called synchronization processing.

The information sharing system according to the embodiment shares setting information among a plurality of clients connected to a server. The server shares contents of setting information shared with a first client with a second client as well. In this manner, the first client and the second client share common setting information with each other.

In the embodiment, the server is, for example, a PC (Personal Computer) and the client is, for example, an image forming apparatus such as a multifunction peripheral. The information sharing system according to the embodiment performs control to back up information managed by the server and restore the backed up information to the server. When setting data is to be shared with a client after executing restore processing, for a device which has not undergone sharing processing of setting data with the server between backup processing and restore processing, the server notifies the client of update information of setting data. This update information is information indicating differences in the contents between the first setting data shared previously with the device and the second setting data held in the server after executing restore processing. For a device which has undergone sharing processing of setting data in advance with the server between the period for executing backup and period for executing restore, the server sends a predetermined notification to the client to cause the device to acquire the setting data held in the server after the execution of restore processing. The following will describe an example in which the client is a multifunction peripheral. This multifunction peripheral is an image forming apparatus which includes a printing function.

During restore processing, if all the information held in the server is rewritten with information at the time of backup processing, information held in the apparatus in between backup processing and restore processing will be also rewritten into information at the time of backup processing. If information has been shared with the multifunction peripheral between the time of backup processing and the time of restore processing, however, a mismatch occurs as follows.

That is, a mismatch occurs between the information held in the server and the information held in the multifunction peripheral. For example, assume a case where the server, which did not hold the address information of a person A at the time of backup processing, comes to hold the address information of the person A from sharing information with a multifunction peripheral A which holds the address information of the person A after backup processing. In this case, the address information of the person A is not included in the backup information. If processing to restore backup information in the server is performed, a state is set in which address information of the person A is held in the multifunction peripheral A, while no address information of the person A is included in the information held in the server. In this manner, a mismatch occurs between the information held in the server and the information held in the multifunction peripheral.

The information sharing system according to the embodiment, therefore, overwrites the information held in the multifunction peripheral which shared information (synchronization processing) in between backup processing and restore processing with information held in the server after restore processing. When information is overwritten in the multifunction peripheral in this manner, information matching the current configuration of the multifunction peripheral is held in the server even if restore processing is performed, and information can be shared appropriately between the server and the multifunction peripheral even after restore processing.

Embodiments of the present invention will be described below with reference to the accompanying drawings.

FIG. 1 is a diagram showing the system arrangement of the entire system according to the invention. In this data synchronization system, a multifunction peripheral 110a, a multifunction peripheral 110b, and a server 120a as respective information processing apparatuses that perform data difference synchronization, and a server 120b as a data backup destination are connected to a network 100 and can mutually communicate with each other. Depending on the embodiment, the server of the difference synchronization system will be the multifunction peripheral 110a or the server 120a. However, the server may be another apparatus as long as any one of the information processing apparatuses is operating as the server. Note that multifunction peripherals 110a and 110b will be collectively called multifunction peripherals 110, and the servers 120a and 120b will be collectively called servers 120. The system includes at least one server as well as one multifunction peripheral as a client.

FIG. 2 is a block diagram showing the arrangement of each multifunction peripheral 110. The multifunction peripheral 110 includes a controller unit 200, an operation unit 220, a scanner 230, and a printer 240. The operation unit 220 is connected to the controller unit 200 as well as the scanner 230 as an image input device and the printer 240 as an image output device.

The controller unit 200, more specifically, includes a CPU (Central Processing Unit) 202 as a processor, and the CPU 202 activates an OS (Operating System) by a boot program stored in a ROM (Read Only Memory) 206. The controller unit 200 executes application programs stored in an HDD (Hard Disk Drive) 205 on the OS and executes various types of processes through it. As the work area for the CPU 202, a RAM (Random Access Memory) 203 is used. The HDD 205 stores the above application programs and various kinds of data.

Together with the ROM 206 and the RAM 203, an operation unit I/F 201, a device I/F 204, a network I/F 207, and an image processing unit 208 for executing image processing are connected to the CPU 202 via a system bus 210.

The operation unit I/F 201 is an interface for the operation unit 220 which has a touch panel. The operation unit I/F 201 can transmit information such as various kinds of data to be displayed to the operation unit 220 and transmit information input by the user to the CPU 202. The device I/F 204 is connected to the scanner 230 and the printer 240 and performs input/output of data and control signals. The network I/F 207 is connected to the network 100 and executes input/output (that is, transmission and reception) of information between the information processing apparatuses on the network 100 via the network 100. The image processing unit 208 performs processing such as processing of an image input from the scanner and processing of an image output to a printer, image rotation, image compression, solution conversion, color space conversion, and tone conversion.

FIG. 3 is a block diagram showing the arrangement of each server 120. In FIG. 3, a CPU 301 performs computation and control of the information processing apparatus. A RAM 302 functions as the main memory of the CPU 301, an execution program area, an execution area of the program, and a data area. A ROM 303 stores the operation processing procedure of the CPU 301. The ROM 303 includes a program ROM storing an operating system (OS) which is a system program for performing device control of the information processing apparatus, and a data ROM storing information necessary for operating the system. An HDD 309 (to be described later) may be used instead of the ROM 303 in some cases. A network I/F (Network) 304 performs communication such as data exchange with another information processing apparatus via a network 100. A VRAM (Video RAM) 305 rasterizes an image to be displayed on the screen of a display 306 of the information processing apparatus and controls the display of the image. The display 306 is a display device such as a liquid crystal display. A KBC 307 is a controller for controlling an input signal from an external device (KB) 308. The KB 308 is an external input device for accepting user operation, and for example, a keyboard and a pointing device such as a mouse are used. The HDD 309 is a hard disk drive and is used for saving application programs and various kinds of data. A transmission bus 300 includes buses (an address bus, a data bus, an input/output bus, and a control bus) for connecting the above-described units.

<Data Synchronization Application>

The first embodiment of the present invention will describe a configuration in which a data synchronization server application 400 is operated on the multifunction peripheral 110a and a data synchronization client application 500 is operated on the multifunction peripherals 110a and 110b. Note that the data synchronization server application will sometimes be referred to as a data management application.

FIG. 4 is a block diagram showing the configuration of the data synchronization server processing program 400 operating in the multifunction peripheral 110a. The data synchronization server application 400 includes a communication processing module 401 that receives a processing request from the multifunction peripheral 110b or the like and transmits a processing result, a control module 402 that performs processing control, a request analysis module 403 that analyzes the request received by the communication processing module 401, a backup processing module 404 that executes backup processing of data held in a database 410, a restore processing module 405 that executes restore processing of data held in the database 410 using the backup data created by the backup processing module 404, and a data access module 406 that accesses the database 410 in response to the processing request and executes data creation/update/delete/reference. Data held in the database 410 is saved in the HDD 205, the RAM 203 or the like.

The data synchronization server application 400 and the database 410 are stored in any one of the storage units such as the RAM 203, the HDD 205, and the ROM 206 and are executed by the CPU 202.

FIG. 5 is a block diagram of the configuration of the data synchronization client processing program 500 operating in the multifunction peripherals 110a and 110b. The data synchronization client application 500 includes a processing reception module 501 that receives a processing request from various applications 410 such as copying or FAX, a control module 502 that performs processing control, a job management module 503 that manages the request received by the processing reception module 501 as a job, a communication processing module 504 that communicates with the data synchronization server application 400 on the multifunction peripheral 110a via the network I/F (Network) 207, and a synchronization information management module 505 that manages information concerning difference synchronization. The information managed by job management module 503 and the synchronization information management module 505 is saved in the HDD 205, the RAM 203, or the like. Various applications 510 manage data to be displayed on the operation unit 220, hold data input by the user through the operation unit 220, and notify the processing reception module 501 of the data synchronization client application 500 of data update contents.

The data synchronization client application 500 and various applications 510 are stored in any one of the storage units such as the RAM 203, the HDD 205, and the ROM 206 and are executed by the CPU 202.

<Synchronization Operation>

If data change occurs from user operation or execution of application processing such as copy/FAX in the multifunction peripheral 110b, the data synchronization client application 500 transmits the change contents to the data synchronization server application 400 on the multifunction peripheral 110a. The servers 120 use these change contents to update the setting data held in the servers 120. In this manner, setting data held in the servers 120 and the setting data held in the multifunction peripherals 110 are synchronized (shared). These change contents are update information indicating the difference between the first setting data previously shared between the multifunction peripherals 110 and the servers 120 and the setting data held in the multifunction peripherals 110. The transmission of the change contents is a first sharing request (synchronization request) to the servers 120 from the multifunction peripherals 110.

The data synchronization client application 500 makes an inquiry regularly, or as needed, to the data synchronization server application 400 of data updates. If there is updated data, the data synchronization client application 500 acquires the data as difference data, and reflects the difference data in various applications 510. That is, the clients 110 use the difference data acquired from the servers 120 to update the setting data held in the clients 110. In this manner, the setting data held in the clients 110 are synchronized (shared) with the setting data held in the servers 120. The difference data is update information indicating the difference between the first setting data previously shared between the multifunction peripherals 110 and the servers 120 and the second setting data held in the servers 120. The inquiry to acquire the difference data is a second sharing request (synchronization request) from the multifunction peripherals 110 to the servers 120.

Assume that address data, for example, a FAX number in an address book is managed by the data synchronization server application 400. When the address data is to be used as a synchronization processing target in both of the multifunction peripherals 110a and 110b, synchronization processing of the address data is to be processed as follows. When a user or the like changes address data A managed by an address book application in the multifunction peripheral 110a, the data synchronization client application 500 is notified of the changed address data A. The data synchronization client application 500 transmits the changed address data A to the data synchronization server application 400 on the multifunction peripheral 110a. The data synchronization server application 400 saves the received address data A in the database 410. This causes the change to be reflected in the database 410 managed by the data synchronization server application 400. The date/time at this moment is recorded as the last update date/time. Subsequently, an update inquiry to the data synchronization server application 400 on the multifunction peripheral 110a is executed by the data synchronization client application 500 on the multifunction peripheral 110b. The update inquiry is performed, for example, periodically. In response to the inquiry, the data synchronization server application 400 transmits the aforementioned address data A as update data to the data synchronization client application 500. Upon receiving the address data A, the data synchronization client application 500 transfers the received address data A to an address book application that manages the address data and updates data in the multifunction peripheral 110b. That is, the data synchronization client application 500 updates data by transferring the received update data to an application that manages the update data. Although the above explanation has been given by exemplifying the address data as data for synchronization, data difference synchronization can be implemented by processing other kinds of data in the same manner. Additionally, the data synchronization client application 500 may be integrated with an application, for example, the address book management application that is managing data.

In this manner, in the data synchronization system of the embodiment, when there is a data update, the server is notified of the data update from the client, and the update is reflected in the databases of the servers. Further, if there is a difference acquisition request (also referred to as update inquiry or update request) from the client, the server sends back difference data (or update data) in response to the request to the client. The client receives the difference data and reflects the data in the client database. This allows the synchronization of the respective databases of the server and the client to be maintained. Note that, although it is desirable for the database of this embodiment to have a mechanism similar to a typical database for maintaining semantic consistency between the records upon a database update, a description of such a procedure will be omitted in this embodiment.

<Backup Processing by Data Synchronization Server Application>

Processing by the data synchronization server application 400 to execute backup processing of data managed in the database 410 will be described with reference to the flowchart of FIG. 6. Backup processing instruction may be an external instruction such as a user instruction or an internal instruction in the multifunction peripherals 110 such as a schedule instruction or a state change event instruction.

The control module 402 of the data synchronization server application 400 instructs the data access module 406 to stop accessing the database 410 upon detecting an instruction to execute backup processing (step S601). Next, the control module 402 instructs the backup processing module 404 to perform backup processing, and the backup processing module 404 accesses the database 410 to specify the target file (step S602). The backup processing module 404 compares the size of the target file with the free space in the backup destination and determines whether there is free memory space that can be used for backup (step S603). If the backup destination is the HDD 205 of the multifunction peripheral 110a, its free space can be detected by making an inquiry to the file system. If the backup destination is a storage on a network, its free space can be detected by making an inquiry via the network 100. In this embodiment, an explanation will be given by exemplifying a case where backup processing is performed on the HDD 205 of the multifunction peripheral 110a. In step S603, if the backup processing module 404 determines that there is enough free space, it specifies and holds the current date/time information (also referred to as backup point or backup point in time) of the multifunction peripheral 110a at the time of execution of backup processing (step S604). Next, in step S605, the backup processing module 404 copies the target file in the database 410 to the directory of the backup destination. The copied backup file is associated with the held date/time information loaded from, for example, a real time clock or the like in step S604. When copying is completed for the entire target file, the backup processing module 404 notifies the control module 402 of the completion of the processing. When the completion of backup processing is detected, the control module 402 notifies the data access module 406 that access to the database 410 is permitted (step S606), and the processing ends.

If the backup processing module 404 determines that there is not enough free space in step S603, it determines whether to delete past backup files (step S607). This determination may be made by a user instruction or it may be a determination of whether it is possible to delete past backup files based on their dates/times of creation. If the backup processing module 404 determines, in step S607, to delete the past backup files, the backup processing module 404 deletes the past backup files in step S608 and the process returns to step S603. If the backup processing module 404 determines, in step S607, not to delete the past backup files, it notifies the backup instruction source that backup processing cannot be executed and notifies the control module 402 of the backup processing failure. When the backup failure notification is detected, the control module 402 notifies the data access module 406 that access to the database 410 is permitted (step S609) and the processing ends.

Note that in this embodiment, although an explanation has been given by exemplifying a file-based database, if the database 410 has a backup function, in step S602, a backup file may be created by instructing the database 410 to perform backup processing rather than specifying a target file. In addition, processing of inhibiting/permitting access to the database 410 (steps S601, S606, and S609) may be implemented either by the database 410 or the data synchronization server application 400. Further, instead of full backup processing, in step S602 the backup processing module 404 may request the database 410 to create a difference backup file and specify a file in a similar manner for difference backup processing.

<Restore Processing by Data Synchronization Server Application>

Processing by the data synchronization server application 400 to execute restore processing of data managed in the database 410 will be described with reference to the flowchart of FIG. 7. A restore processing instruction may be an external instruction such as a user instruction or an internal instruction in the data synchronization server application 400 and the database 410 such as a restoration instruction concerning the detection of a mismatch in the database.

The control module 402 of the data synchronization server application 400 instructs the data access module 406 to stop accessing the database 410 upon detecting an instruction to execute restore processing, (step S701). Next, the control module 402 gives instructions to the restore processing module 405 about the restore target file and the execution of restore processing, and the restore processing module 405 specifies and holds the backup data and the backup execution date/time associated and saved with the data (step S702). Subsequently, the restore processing module 405 specifies and holds the current date/time information (also referred to as restore point or restore point in time) of the multifunction peripheral 110a as the restore processing execution date/time (step S703). In step S704, the restore processing module 405 accesses the database 410 to acquire, from client apparatus information 810 shown in FIG. 8, and hold, among the information managed in the database 410, the correction time information of all multifunction peripherals 110 in which the data synchronization client application 500 is operating.

<Example of Database>

FIG. 8 shows tables showing data examples managed in the database 410. In the client apparatus information 810, information (identifier [apparatus ID] 811, identification ID 812, name 813, last access date/time 814 to the information processing apparatus, and the like) of the information processing apparatus in which the data synchronization client application 500 that is performing data synchronization processing with the data synchronization server application 400 is operating is registered. Correction time information 815 for correcting the difference in date/time information between each server and each client is also registered in the client apparatus information 810. Note that in this example, although the client apparatus information 810 is data for the data synchronization server application 400 and is not a synchronization target, the client apparatus information 810 can become a synchronization target when sharing with a client. In apparatus setting data 820, various kinds of setting data (display language setting, default print setting, and the like) used for the operation of the information processing apparatus are registered as a key (Key) 821 indicating a setting and a value (Value) 822 corresponding to the key. A corresponding apparatus ID 823, last update date/time 824 of the item, and data update date/time 825 are also registered in the apparatus setting data 820. The last update date/time 824 is the date/time when the data was last updated in the client, and the data update date/time 825 is the date/time when that update was committed to the database 410. In user authentication data 830, user identification information (an ID 831 and a password 832) used for authentication processing to use the information processing apparatus, a user name 833, and information such as the authority and assigned group of the user are registered. Last update date/time 834 and data update date/time 835 of these items are registered as well. In user setting data 840, setting data (for example, address data of an address book) registered for each user is registered as a key 841 indicating a setting and a value 842 corresponding to the key. A corresponding apparatus ID 843, last update date/time 844 of the item, and data update date/time 845 are also registered in the user setting data 840.

Returning to FIG. 7, when saving of the correction time information is completed, the restore processing module 405 performs restore processing by replacing a backup data file with a management file which is managed by the database 410 and checks if there is any data mismatch (step S705). In step S706, the restore processing module 405 instructs the database 410 to update the last update date/time of the restored data by using the restore implementation date/time which was held in step S703. In step S707, after processing of the database 410 is completed, the restore processing module 405 instructs the database 410 to update so that the correction information of each multifunction peripheral 110 which was held in step S704 is applied to the respective restored data. By the application of the correction time data, the time lag between the apparatuses is corrected. When the processing of the database 410 is completed, the restore processing module 405 deletes the management file managed by the database 410 before the restore processing and notifies the control module 402 that the restore processing has been completed. When the control module 402 detects or receives the completion of the restore processing, the control module 402 notifies the data access module 406 that access to the database 410 is permitted (step S708), and the processing ends.

In this embodiment, in a similar manner to backup processing, although an explanation has been given by exemplifying a file-based database, if the database 410 has a restore function, the restore processing may be executed by transferring a target file to and instructing the database 410 to perform restore processing rather than by replacing a target file in step S705. In addition, in the case of difference backup processing, the processing of step S705 may be executed after generating data to be restored from the data at the time of full backup processing and the data of difference backup processing in the database 410 or the like. Also, as in the time of backup processing, controlling of inhibiting/permitting access to the database 410 may be implemented by either the database 410 or the data synchronization server application 400.

FIG. 9 shows data after the execution of restore processing when backup processing has been executed at "2014/08/27 13:00:00.112" and restore processing has been executed at "2014/08/28 08:00:00.225" on the data examples managed in the database 410 in FIG. 8. In step S706, the restore processing time "2014/08/28 08:00:00.225" specified in step S703 is updated to the last update date/time of each data. The restore processing in FIG. 7 is performed by the multifunction peripheral 110*a*, and the value of the correction time information 815 of the multifunction peripheral 110*a* read and held from the client apparatus information 810 is 0 as indicated in the table of the client apparatus information 810. Therefore, the last update date/time before and after correction is the same value.

For example, assume that the value of user setting data "fax_address_1" has been updated to "023-456-7890" in the multifunction peripheral 110*b* at "2014/08/27 14:00:00.456" which is a time after the date/time of backup processing at "2014/08/27/13:00:00.112" but before the restore processing at "2014/08/28 08:00:00.225". If the multifunction peripheral 110*b* was not connected to the network at that time and the data synchronization client application 500 and the data synchronization server application 400 could not communicate, the data synchronization client application 500 of the multifunction peripheral 110*b* holds the data as user setting data updated at "2014/08/27 14:00:00.456" in the job management module 503. When the multifunction peripheral 110*b* is connected to the network and able to communicate at "2014/08/28/10:00:00.123" after the execution of restore processing, the data synchronization client application 500 of the multifunction peripheral 110*b* requests the data synchronization server application 400 to update the user setting data updated at "2014/08/27 14:00:00.456". In the data synchronization server application 400, upon receiving the update request, the data access module 406 determines whether to update the user setting data "fax_address_1" managed in the database 410. As the last update date/time of the "fax_address_1" after restore processing is at "2014/08/28/08:00:00.225", the data access module 406 determines that the update requested data has been updated after the update date/time "2014/08/27 14:00:00.456" of the update target data. Hence, the data access module 406 determines that the processing has succeeded without sending a data update request to the database 410. That is, the update that was performed in the multifunction peripheral 110*b* at "2014/08/27 14:00:00.456" is discarded without being reflected in the database. In this manner, even if processing contents, that is update data, that had been held in a client before the implementation of restore processing exist, the database managed by the data synchronization server application 400 can be maintained in the state immediately after the restore processing.

<Synchronization Request (Sharing Request) Processing by Data Synchronization Server Application>

Processing for a case where the multifunction peripherals 110*a* and 110*b* respectively implement a data acquisition request (that is, a synchronization request) for data difference synchronization after the execution of restore processing at "2014/08/28 08:00:00.225" will be described next with reference to the flowchart of FIG. 10. Assume that the multifunction peripheral 110a has executed the last difference data acquisition request (that is, an update request) at "2014/08/28 07:59:10.487" immediately before restore processing. The date/time of this last difference data acquisition request is also referred to as synchronization request point or synchronization request point in time. On the other hand, assume that the multifunction peripheral 110b has not executed a difference data acquisition request since the last difference data acquisition request at "2014/08/27 10:54: 14.369" before the backup processing. Note that the date/time of the last difference data acquisition request is the date/time of the last synchronization and indicates that no synchronization has been performed since the last synchronization. When the communication processing module 504 of the data synchronization client application 500 makes an update inquiry, that is, sends a difference data acquisition request, to the data synchronization server application 400, the last data acquisition date/time (last acquisition date/time), that is the difference data acquisition date/time of the execution of the last synchronization processing, of each data held in the synchronization information management module 505 of the data synchronization client application 500 is attached and transmitted. Note that last acquisition date/time attached to the difference data acquisition request is also referred to as request date/time to indicate that difference generated since that date/time is being requested.

First, processing of the data synchronization server application 400 when it receives an acquisition request from the data synchronization client application 500 of the multifunction peripheral 110a for difference data generated since the last acquisition date/time at "2014/08/28 07:59:10.487" will be described. Upon receiving a request from the data synchronization client application 500, the communication processing module 401 of the data synchronization server application 400 notifies the control module 402 of the reception of the request (step S1001). The control module 402 transfers the received request to the request analysis module 403 and requests it to analyze the received request. The request analysis module 403 specifies, from the received request, that the request source apparatus is the multifunction peripheral 110a and the request contents are, for example, information indicating the request and the request date "2014/08/28 07:59:10.487" attached to the request (step S1002). The control module 402, upon receiving the analysis result from the request analysis module 403, determines whether the result is a difference data acquisition request (step S1003). If the control module 402 determines that the request is a difference data acquisition request, the control module 402 holds the request date/time "2014/08/28 07:59:10.487" attached to the difference request (step S1004). In step S1005, the control module 402 acquires, from the restore processing module 405, the backup execution date/time specified in step S702 and the restore implementation date/time specified in step S703. The control module 402 then determines whether the request date/time is in between the backup date/time and restore date/time (step S1006). If the request date/time is in between the backup date/time and the restore date/time, the control module 402 instructs the communication processing module 401 to send back a data mismatch error to the request source. In this case, since the last update of the client was performed between the backup processing and the restore processing of the server, the restore processing by the server has generated a mismatch between the database of the client and the database of the server. In this example, the request date/time "2014/08/28 07:59:10.487" is between the backup date/time "2014/08/27 13:00:00.112" and the restore date/time "2014/08/28/08:00:00.225". Therefore, the communication processing module 401 sends back a data mismatch error to the data synchronization client application 500 as the request source (step S1007), and the processing ends.

Upon detecting that a data mismatch error has been returned from the data synchronization server application 400, the communication processing module 504 of the data synchronization client application 500 of the multifunction peripheral 110a transmits, for the same data, an all data acquisition request that requests for, instead of the difference data, the entire target data file to the data synchronization server application 400.

When the data synchronization server application 400 receives the all data acquisition request, the same above-described processing is executed, and the control module 402 determines that the received request is not a difference data acquisition request in step S1003. In this case, the control module 402 requests the data access module 406 to execute all data acquisition request processing. The data access module 406 specifies and holds the date/time of the multifunction peripheral 110a in which the data synchronization server application 400 is operating at the time of processing execution (step S1008). The data access module 406 sends a data acquisition request to the database 410 and acquires all the requested data (step S1009). The data access module 406 sends back the acquired data and the date/time information held in step S1008 to the control module 402. The control module 402 requests the communication processing module 401 to transmit the acquired data to the request source. The communication processing module 401 converts the date/time information and the data into a predetermined format and transmits the converted date/time information and data, as the processing result, to the data synchronization client application 500 of the request source (step S1010), and the processing ends.

Upon receiving the response data in the communication processing module 504, the data synchronization client application 500 causes the communication processing module 504 to analyze the response data. The communication processing module 504 notifies the target application 510 of the analyzed and specified response data, and the application 510 deletes the held data and newly registers the response data transmitted from the data synchronization server application 400. Additionally, the communication processing module 504 requests the synchronization information management module 505 to update the last data acquisition date/time information based on the analyzed and specified date/time information, and the synchronization information management module 505 updates the held last data acquisition date/time information. This date/time information becomes the next request date/time. From the above-described procedure, the database 410 of the data synchronization server application 400 and the client data is synchronized.

Processing of the data synchronization server application 400 when it receives an acquisition request for difference data since "2014/08/27 10:54:14.369" from the data synchronization client application 500 of the multifunction peripheral 110b will be described in accordance with FIG. 10. Since the procedure is the same as described above, some parts of the procedure will be explained concisely. Upon receiving a difference data acquisition request from the data synchronization client application 500, the communication processing module 401 of the data synchronization server application 400 notifies the control module 402 of the reception of the request and executes the same processing as described above. Since the difference request date/time "2014/08/27 10:54:14.369" is a date/time before the backup date/time, the control module 402 determines in step S1006 that the request date/time is not in between the backup date/time and the restore date/time, and the process advances to step S1011. In step S1011, the control module 402 sends an acquisition request for difference data since "2014/08/27 10:54:14.369" to the data access module 406. Upon receiving the difference data acquisition request, the data access module 406 specifies and holds the date/time of the multifunction peripheral 110a in which the data synchronization server application 400 is operating at the time of processing execution (step S1011). The data access module 406 sends, to the database 410, an acquisition request for data updated since "2014/08/27 10:54:14.369" and acquires difference data generated since "2014/08/27 10:54:14.369" (step S1012). The data access module 406 sends back the acquired difference data and the date/time information held in step S1011 to the control module 402, and the control module 402 requests the communication processing module 401 to send back the acquired data to the request source. The communication processing module 401 converts the date/time information and the data into a predetermined format and transmits, as a processing result, the converted date/time information and data to the data synchronization client application 500 of the request source (step S1013), and the processing ends.

Upon receiving the response data in the communication processing module 504, the data synchronization client application 500 causes the communication processing module 504 to analyze the response data. The communication processing module 504 notifies the target application 510 of the analyzed and specified response data, and the application 510 updates the held data. Additionally, the communication processing module 504 requests the synchronization information management module 505 to update the last data acquisition date/time information based on the analyzed and specified date/time information, and the synchronization information management module 505 updates the held last data acquisition date/time information. From this procedure, the database of the server and the database of the client can be synchronized using the difference data. Note that synchronization using only the difference data is also possible for a case where the request date/time is more recent than the restore date/time, since it can be determined that the restored database of the server and the restored client database have already been synchronized.

As described above, when the master data of the server has been restored with the backup data, data mismatch can be solved by returning an error notification to a client that holds data which only existed in the period between backup processing and the restore processing and causing the client to discard the data. Further, since it is possible to continue the normal difference synchronization processing, it becomes unnecessary to wastefully communicate with a client that does not hold data which only existed in the period between backup processing and the restore processing.

In this embodiment, although a data mismatch error is sent back in step S1007, it is possible to send back the data mismatch error information together with all the data and the date/time information by executing the processes in steps S1008 and S1009. In such a case, instead of sending an all data acquisition request, the data synchronization client application 500 can delete the data already held in the client and re-register data by using the received data and date/time information. This can allow the number of times of communication to be reduced.

Note that it is possible to regard the above-described synchronization request as containing a request for requesting difference data and a request for requesting all the target data.

Second Embodiment

In the second embodiment of the present invention, processing of a data synchronization client application 500 when it has received a data mismatch error differs from the processing in the first embodiment, therefore an explanation of the different processes will be given.

Processing when the data synchronization client application 500 receives a data mismatch error will be described with reference to the flowchart of FIG. 11. Upon receiving a data mismatch error, a communication processing module 504 determines the type of requested data (step S1101). If it is determined that the data is, like the user authentication data 830, fixed format data regardless of the model of multifunction peripherals 110, the process advances to step S1102. In step S1102, in the same manner as in the first embodiment, the communication processing module 504 requests acquisition of all data. When all the data are acquired, a target application 510 is notified of the data, all cache data held in the application are deleted (step S1103), the acquired data are registered (step S1104), and synchronization processing ends. At this time, the last data synchronization date/time is updated.

In step S1101, if the data is fixed format data regardless of the model of the multifunction peripherals 110 and is data (for example, user setting data 840) that will be requested data acquisition of in a unit such as a user or group, the process advances to step S1105. The communication processing module 504 sends, to a data synchronization server application 400 on a multifunction peripheral 110a, an all data acquisition request for the user/group which resulted in a data mismatch error in the difference acquisition request. Upon acquiring all the requested data of the user/group from the data synchronization server application 400, the communication processing module 504 analyzes the received data (step S1105). The communication processing module 504 notifies the target application 510 of the analyzed and specified data. The application 510 deletes only the data of the user/group among the held data (step S1106) and registers the acquired data (step S1107). Subsequently, the communication processing module 504 requests a synchronization information management module 505 to update the last data acquisition date/time information based on the analyzed and specified date/time information. The synchronization information management module 505 updates last data acquisition date/time information held in the user/group unit (step S1107), and the processing ends.

In step S1101, if the data is data (for example, apparatus setting data 820) that has differences in the necessary types and numbers of settings depending the model or the version of the multifunction peripherals 110, that is, if there is a possibility that a format of the data such as the types and numbers of items will change depending on the update, the process advances to step S1108. The communication processing module 504 transmits an all data acquisition request, instead of difference data acquisition, and acquires all the data of the requested data. The communication processing module 504 notifies the target application 510 of the acquired data, and the application 510 updates the held data with the acquired data (step S1108). At this time, the application 510 does not delete the held data. Next, the communication processing module 504 requests the data synchronization server application 400 of the multifunction peripheral 110a to delete all target data (step S1109). Upon receiving the all deletion request, the data synchronization server application 400 deletes the target data held in a database 410 and sends back the result. Subsequently, the communication processing module 504 of the data synchronization client application 500 acquires all the data held in the application 510 and uses the data to request the data synchronization server application 400 of the multifunction peripheral 110a for the creation of all the data (step S1110). The data synchronization server application 400 registers the received data in the database 410 and sends back the processing result, and the processing ends.

As described above, for data such as the apparatus setting data 820 in which the data keys increase when the system version of the multifunction peripherals 110 is updated, backup data is restored in the database to cause the increased keys to exist only in the client. Even in such a case, the data mismatch can be solved by updating the data of the server with all the keys and values held in the client upon reflecting the data of the server. Further, in a case of data such as the user setting data that is handled as a user/group unit, the data mismatch can be solved by not reacquiring all data but reacquiring only data necessary for each user/group unit.

Third Embodiment

In the third embodiment of the present invention, since determination processing of a data synchronization server application 400 for sending back a data mismatch error differs from the processing in the first embodiment, an explanation of the different processes will be given.

While the data synchronization server application 400 was operated on the multifunction peripheral 110a in the first and second embodiments, the data synchronization server application 400 is operated on a server 120a in this embodiment.

In a same manner as in the first embodiment, backup processing is executed at "2014/08/27 13:00:00.112" and restore processing is executed at "2014/08/28 08:00:00.225" on data examples managed in a database 410 in FIG. 8. Processing for a case where multifunction peripherals 110a and 110b implement data acquisition request for difference synchronization of respective data will be described with reference to the flowchart of FIG. 12. Assume, in this case, that the multifunction peripheral 110a has executed difference data acquisition request at "2014/08/28 07:59:10.487" immediately before restore processing and that the multifunction function peripheral 110b has not executed difference data acquisition request since "2014/08/27 10:54:14.369".

First, processing of the data synchronization server application 400 on the server 120a when it receives an acquisition request for difference data since "2014/08/28 07:59:10.487" from the data synchronization client application 500 of the multifunction peripheral 110a will be described with reference to FIG. 12. Upon receiving a request from the data synchronization client application 500, a communication processing module 401 of the data synchronization server application 400 notifies a control module 402 of reception of the request (step S1201). The control module 402 transfers the received request to a request analysis module 403 and requests it to analyze the request. From the received request, the request analysis module 403 specifies that the request source multifunction peripheral is the multifunction peripheral 110a and that the request is a request for acquiring difference data since "2014/08/28 07:59:10.487" (step S1202). Upon acquiring the analysis result from the request analysis module 403, the control module 402 determines whether the request is a difference data acquisition request (step S1203). If the control module 402 determines that the request is a difference data acquisition request, the control module 402 acquires an unaccessed client list information from a restore processing module 405 (step S1204). The unaccessed client list information held in the restore processing module 405 is generated when the restore processing module 405 accesses the database 410 and acquires a client apparatus information list upon execution of restore processing.

Upon execution of the restore processing, the restore processing module 405 accesses client apparatus information 810 indispensable for restore processing, acquires the IDs of the apparatuses, and creates an initial unaccessed client list that is associated with data held in respective apparatuses for each ID. Such data is, for example, a data file as a unit to be used at the time of all data update. Data examples of the unaccessed client list information are shown in FIG. 13. In the unaccessed client list information, the client apparatus and target data are managed as a combination. FIG. 13 shows an example of initial values of the unaccessed client list information according to the system. All the client apparatuses and data of the client apparatuses are included in the list.

In step S1205, the control module 402 determines whether the combination of the multifunction peripheral 110a as a request source specified in step S1202 and the target data of the request contents (for example, assume that it is "User1" of user setting data) exists in the unaccessed client list information. If the control module 402 determines that the combination exists, the control module 402 requests the restore processing module 405 to delete the information of "user setting data" in "the multifunction peripheral 110a" from the unaccessed client list information. The restore processing module 405 updates the held unaccessed client list information and sends back the processing result to the control module 402 (step S1206). The control module 402 requests the communication processing module 401 to return a data mismatch error. The communication processing module 401 sends back a data mismatch error to the multifunction peripheral 110a as a request source (step S1207), and the processing ends.

Upon detecting that a data mismatch error was returned from the data synchronization server application 400, a communication processing module 504 of the data synchronization client application 500 of the multifunction peripheral 110a transmits, for the same data, an all data acquisition request (all data acquisition request for user setting data of "User1") instead of a difference data acquisition request to the data synchronization server application 400.

When the data synchronization server application 400 receives the all data acquisition request, the same processing as described above is executed, and the control module 402 determines in step S1203 that the request is not a difference data acquisition request. In this case, the control module 402 requests a data access module 406 to execute all data acquisition processing. The data access module 406 specifies and holds the date/time of the server 120a in which the data synchronization server application 400 is operating at the time of the execution of the processing (step S1208). The data access module 406 sends the data acquisition request to the database 410 and acquires all of the requested data (step S1209). The data access module 406 sends back the acquired data and the date/time information held in step S1208 to the control module 402. The control module 402 requests the restore processing module 405 to delete the combination of the request source information apparatus and the requested target data from the unaccessed client list information (step S1210). If no data of the requested combination exists in the unaccessed client list information, it is determined that the processing has succeeded. Upon updating of the unaccessed client list information, the control module 402 requests the communication processing module 401 to transmit the acquired data to the request source. The communication processing module 401 converts the date/time information and the data into a predetermined format and transmits the converted information and data as a processing result to the data synchronization client application 500 of the request source (step S1211), and the processing ends.

Upon receiving the response data in the communication processing module 504, the data synchronization client application 500 causes the communication processing module 504 to analyze the data. The communication processing module 504 notifies a target application 510 of the analyzed and specified data, and the application 510 deletes the held data and newly registers the data sent back from the data synchronization server application 400. Although the user setting data of "User1" was acquired, the application 510 deletes the user setting data of all users/groups. Additionally, the communication processing module 504 requests a synchronization information management module 505 to update the last data acquisition date/time information based on the analyzed and specified date/time information. The synchronization information management module 505 deletes the held last data acquisition date/time information of all the users/groups and updates the last data acquisition date/time information of the user of the update request.

Next, processing of the data synchronization server application 400 when it receives an acquisition request from the data synchronization client application 500 of the multifunction peripheral 110b for difference data generated since the last acquisition date/time at "2014/08/27 10:54:14.369" will be described. Although the determination differed in step S1006 in case of the first embodiment, the processing will be the same as in the case of the multifunction peripheral 110a for this embodiment. For example, if the target data is user authentication data in the case of the multifunction peripheral 110b, the combination of "user authentication data" of "D00002" is deleted from the unaccessed client list. Subsequently, the communication processing module 504 of the data synchronization client application 500 acquires, in accordance with the mismatch error response, all the user authentication data and notifies the target application 510. The target application 510 updates the held data, and the synchronization information management module 505 updates the last data synchronization date/time.

As described above, by returning a data mismatch error at the time of the first difference data acquisition request after implementation of restore processing, data synchronization mismatch can be solved.

Fourth Embodiment

In the fourth embodiment of the present invention, since processing of a data synchronization client application 500 when it has received a data mismatch error and data sent back by a data synchronization server application 400 differ, an explanation of the different processes will be given. Note that in the following explanation, each server may be either a multifunction peripheral 110 or a server 120.

Processing of the data synchronization client application 500 when it receives a data mismatch error will be described with reference to the flowchart of FIG. 14. When the data synchronization server application 400 makes a determination to send back a data mismatch error, the date/time information of backup data specified in step S1005 is sent back together with the data mismatch error information to the request source in this embodiment. When the data synchronization client application 500 receives the data mismatch error, a communication processing module 504 acquires, from the response data, the date/time information of the backup data sent back from the data synchronization server application 400 (step S1401). Based on the data mismatch error and by using the date/time information of the backup data, the communication processing module 504 displays a selection dialogue (user interface) on the operation unit 220 of the multifunction peripheral 110. An example of the dialogue to be displayed is shown in FIG. 15. Using the acquired date/time information of the backup data, the point in time to which the data of the server is being returned is displayed in a selection dialogue 1501. Further, a reacquisition button 1502 and a re-register button 1503 are displayed. The user using the multifunction peripheral 110 selects whether to discard the data in the multifunction peripheral 110 and acquire the data of the server (selection of the reacquire button 1502) or to re-register the data in the multifunction peripheral 110 to the server (selection of re-register button 1503). Upon detecting the selection result, the communication processing module 504 executes processing in accordance with the selected contents (step S1403). If the reacquire button 1502 is selected, the process advances to step S1405. In a same manner as in the processing described in the first embodiment, all the target data are acquired from the server, all the data in the multifunction peripheral 110 are discarded, all the acquired data are reregistered in the multifunction peripheral 110, and the synchronization processing ends. If the re-register button 1503 is selected, the process advances to step S1404. In step S1404, the communication processing module 504 acquires all the target data from application from applications 510 and sends a data update request to the data synchronization server application 400. The data synchronization server application 400 uses the received data to update all the data held in a database 410 and sends back the result. The synchronization processing ends when the communication processing module 504 receives an update request success notification.

As described above, not for data managed by the administrator of the multifunction peripheral 110 but for data managed by the user using the multifunction peripheral 110, the user can select data forcibly registered by the user instead of having to return to data at the time of backup even if the administrator restores the data of the server.

According to the present invention, synchronization with the client can be maintained even if the server is restored.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-210169, filed Oct. 14, 2014 which is hereby incorporated by reference herein in its entirety.

The invention claimed is:

1. An information system including an information processing apparatus and a device,
the information processing apparatus comprising:
a first memory storing instructions; and
a first processor that executes the instructions stored in the first memory to cause the information processing apparatus to:
hold setting data used by a device connected to the information processing apparatus in a first database of the information processing apparatus;
control backup of the setting data held in the first database;
control execution of restoring the setting data backed up to the first database;
receive a request for acquiring setting data in the database from the device after the execution of the restoring, wherein the request includes time information;
when the time information included in the received request is not between the backup and the execution of restoring, send, to the device, update information indicating setting data corresponding to data updated in the first database since the time information included in the received request; and
when the time information included in the received request is between the backup and the execution of restoring, notify the device of a predetermined notification for causing the device to acquire setting data held in the first database after the execution of restoring; and
the device comprising:
a second memory storing instructions; and
a second processor that executes the instructions stored in the second memory to cause the information processing apparatus to:
hold setting data in a second database of the device;
send the request to the information processing apparatus, and
update the second database using the received update information.

2. The information processing apparatus according to claim 1, wherein the predetermined notification is an error response.

3. The apparatus according to claim 1, wherein the instructions further cause the information processing apparatus to:
receive, from the device that received the predetermined notification, another request, and
transmit, to the device, one entire setting data out of the setting data held by the database.

4. An information processing apparatus comprising:
a memory storing instructions; and
a processor that executes the instructions to cause the information processing apparatus to:
hold setting data used by a device connected to the information processing apparatus in a database;
control backup of the setting data held in the database;
control execution of restoring the setting data backed up to the database;
receive a request for acquiring setting data in the database from the device after the execution of the restoring, wherein the request includes time information;
when the time information included in the received request is not between the backup and the execution of restoring, send, to the device, update information indicating setting data corresponding to data updated in the database since the time information included in the received request, and
when the time information included in the received request is between the backup and the execution of restoring, notify the device of a predetermined notification for causing the device to acquire setting data held in the database after the execution of restoring.

5. A control method of an information processing apparatus, the control method comprising:
holding setting data used by a device connected to the information processing apparatus in a database;
controlling backup of the setting data held in the database;
controlling execution of restoring the setting data backed up to the database;
receive a request for acquiring setting data in the database from the device after the execution of the restoring, wherein the request includes time information;
when the time information included in the received request is not between the backup and the execution of restoring, send, to the device, update information indicating setting data corresponding to data updated in the database since the time information included in the received request; and
when the time information included in the received request is between the backup and the execution of restoring, notify the device of a predetermined notification for causing the device to acquire setting data held in the database after the execution of restoring.

6. A non-transitory computer readable medium for storing a program for causing a computer to execute a method of controlling an information processing apparatus, the method comprising:
holding setting data used by a device connected to the information processing apparatus in a database;
controlling backup of the setting data held in the database;
controlling execution of restoring the setting data backed up to the database;

receive a request for acquiring setting data in the database from the device after the execution of the restoring, wherein the request includes time information;

when the time information included in the received request is not between the backup and the execution of restoring, send, to the device, update information indicating setting data corresponding to data updated in the database since the time information included in the received request; and when the time information included in the received request is between the backup and the execution of restoring, notify the device of a predetermined notification for causing the device to acquire setting data held in the database after the execution of restoring.

* * * * *